(12) United States Patent
Sato et al.

(10) Patent No.: US 12,068,502 B2
(45) Date of Patent: Aug. 20, 2024

(54) BATTERY WIRING MODULE

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Maya Nakasuka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 808 days.

(21) Appl. No.: 17/267,274

(22) PCT Filed: Aug. 26, 2019

(86) PCT No.: PCT/JP2019/033321
§ 371 (c)(1),
(2) Date: Feb. 9, 2021

(87) PCT Pub. No.: WO2020/045347
PCT Pub. Date: Mar. 5, 2020

(65) Prior Publication Data
US 2021/0313656 A1    Oct. 7, 2021

(30) Foreign Application Priority Data

Aug. 29, 2018  (JP) .............................. 2018-160508

(51) Int. Cl.
*H01M 50/502* (2021.01)
*H01M 50/20* (2021.01)
(Continued)

(52) U.S. Cl.
CPC ......... *H01M 50/503* (2021.01); *H01M 50/20* (2021.01); *H01M 50/204* (2021.01);
(Continued)

(58) Field of Classification Search
None
See application file for complete search history.

(56) References Cited

U.S. PATENT DOCUMENTS

| 9,825,272 | B2 | 11/2017 | Shitamichi et al. |
| 11,289,775 | B2 * | 3/2022 | Mori ................... H01M 50/572 |

(Continued)

FOREIGN PATENT DOCUMENTS

| JP | 2008-288077 | 11/2008 |
| JP | 2011-258413 | 12/2011 |

(Continued)

OTHER PUBLICATIONS

Official Communication issued in International Bureau of WIPO Patent Application No. PCT/JP2019/033321, dated Oct. 8, 2019, along with an English translation thereof.

*Primary Examiner* — Jeremiah R Smith
(74) *Attorney, Agent, or Firm* — GREENBLUM & BERNSTEIN, P.L.C.

(57) ABSTRACT

Provided is a battery wiring module according to which a load that acts on module-side terminals accompanying expansion or contraction of battery cells can be reduced. A housing includes a wire accommodating portion for accommodating wires, multiple terminal accommodating portions for accommodating module-side terminals, and first elastic joining portions that join the wire accommodating portion and the terminal accommodating portions in an elastically-deformable manner in the direction in which the battery cells are aligned.

10 Claims, 7 Drawing Sheets

(51) Int. Cl.
  *H01M 50/204* (2021.01)
  *H01M 50/209* (2021.01)
  *H01M 50/284* (2021.01)
  *H01M 50/287* (2021.01)
  *H01M 50/296* (2021.01)
  *H01M 50/298* (2021.01)
  *H01M 50/503* (2021.01)
  *H01M 50/505* (2021.01)
  *H01M 50/507* (2021.01)
  *H01M 50/516* (2021.01)
  *H01M 50/517* (2021.01)
  *H01M 50/519* (2021.01)
  *H01M 50/572* (2021.01)
(52) U.S. Cl.
  CPC ....... *H01M 50/209* (2021.01); *H01M 50/284* (2021.01); *H01M 50/287* (2021.01); *H01M 50/296* (2021.01); *H01M 50/298* (2021.01); *H01M 50/502* (2021.01); *H01M 50/505* (2021.01); *H01M 50/507* (2021.01); *H01M 50/516* (2021.01); *H01M 50/517* (2021.01); *H01M 50/519* (2021.01); *H01M 50/572* (2021.01); *H01M 2220/20* (2013.01)

(56) References Cited

U.S. PATENT DOCUMENTS

2014/0162101 A1    6/2014  Wang et al.
2019/0305277 A1*  10/2019  Wang .................. H01M 50/103

FOREIGN PATENT DOCUMENTS

| JP | 2014-527270 | 10/2014 | |
| JP | 2015-002164 | 1/2015 | |
| WO | WO-2011057698 A2 * | 5/2011 | ............ H01M 2/043 |
| WO | 2013/069756 | 5/2013 | |
| WO | WO-2014181820 A1 * | 11/2014 | ......... H01M 10/425 |
| WO | WO-2017065030 A1 * | 4/2017 | ............. H01M 2/10 |

* cited by examiner

BATTERY WIRING MODULE

TECHNICAL FIELD

The present invention relates to a battery wiring module.

BACKGROUND ART

For example, as disclosed in Patent Document 1, a battery wiring module is attached to a high-voltage secondary battery that is mounted as a power source for travel driving in a vehicle such as an electric automobile or a hybrid automobile. In the battery wiring module, module-side terminals are connected to bus bars that connect the multiple battery cells constituting the secondary battery.

CITATION LIST

Patent Documents

Patent Document 1:JP 2015-2164A.

SUMMARY OF INVENTION

Technical Problem

Incidentally, with the above-described battery wiring module, the bus bars and the module-side terminals move accompanying thermal expansion and contraction of the multiple battery cells. At this time, if the positions of the terminal accommodating portions accommodating the module-side terminals are fixed, the module-side terminals move relative to the terminal accommodating portions. Accordingly, there is a risk that a load will be applied to the module-side terminals.

The present invention has been achieved to solve the above-described problem, and it is an object thereof to provide a battery wiring module that can reduce a load that acts on a module-side terminal accompanying expansion and contraction of a battery cell.

Solution to Problem

A battery wiring module for solving the above-described problem is a battery wiring module including: module-side terminals that are electrically connected to bus bars connecting battery terminals of a plurality of battery cells; wires with ends on one side connected to the module-side terminals; and a housing for accommodating the wires and the module-side terminals. The housing includes: a wire accommodating portion for accommodating the wires; a plurality of terminal accommodating portions for accommodating the module-side terminals; and first elastic joining portions joining the wire accommodating portion and the terminal accommodating portions in a direction in which the battery cells are aligned, in an elastically-deformable manner.

According to the above-described aspect, the wire accommodating portion and the terminal accommodating portions are joined by the first elastic joining portions in the direction in which the battery cells are aligned, in an elastically-deformable manner, and thus even if the battery cells expand and contract, the displacement can be absorbed by the elastic deformation of the first elastic joining portions. That is, when the module-side terminals connected to the bus bars comply with the expansion or contraction of the battery cells, the terminal accommodating portions can comply with the expansion or contraction due to the elastic deformation of the first elastic joining portions. Accordingly, the load applied to the module-side terminals can be suppressed.

The above-described battery wiring module preferably includes a second elastic joining portion joining the terminal accommodating portions that are adjacent to each other in the direction in which the battery cells are aligned, in an elastically-deformable manner.

According to the above-described aspect, the terminal accommodating portions that are adjacent to each other in the direction in which the battery cells are aligned are joined by the second elastic joining portion in an elastically-deformable manner, and thus even if the battery cells expand or contract, the displacement can be absorbed by the elastic deformation of the second elastic joining portion. That is, the module-side terminals connected to the bus bars comply with the bus bars to which they are connected, accompanying the expansion or contraction of the battery cells. At this time, although the module-side terminals move toward or away from each other in some cases, the terminal accommodating portions can comply due to the terminal accommodating portions being joined by the second elastic joining portion in an elastically-deformable manner as described above. Accordingly, the load applied to the module-side terminals can be suppressed.

In the above-described battery wiring module, it is preferable that the housing includes blocking wall portions that each block at least one of a gap between the wire accommodating portion and a terminal accommodating portion and a gap between terminal accommodating portions that are adjacent to each other in the direction in which the battery cells are aligned.

According to the above-described aspect, the blocking wall portions are each included in at least one of a gap between the wire accommodating portion and a terminal accommodating portion and a gap between terminal accommodating portions that are adjacent to each other in the direction in which the battery cells are aligned, and thus spatter, which occurs when performing welding of the connection between the module-side terminal and the bus bar or the connection between the bus bar and the battery terminal, is suppressed from flying into the gap.

In the above-described battery wiring module, it is preferable that the second elastic joining portion also serves as the blocking wall portion for blocking the gap between the terminal accommodating portions that are adjacent to each other in the direction in which the battery cells are aligned.

According to the above-described aspect, by using a configuration in which the second elastic joining portion also serves as the blocking wall portion, the second elastic joining portion and the blocking wall portion are suppressed from being included separately.

In the above-described battery wiring module, it is preferable that the wire accommodating portion includes a plurality of recesses in the direction in which the plurality of battery cells are aligned, the plurality of recesses being recessed in a direction that is orthogonal to the direction in which the plurality of battery cells are aligned, and that is orthogonal to a direction of stacking the housing on the battery cells, and the terminal accommodating portions are included in the recesses.

According to the above-described aspect, by including the terminal accommodating portions in the recesses, it is possible to prevent an increase in size of the battery wiring module caused by the terminal accommodating portions.

In the above-described battery wiring module, it is preferable that the terminal accommodating portions and the wire accommodating portion include lead-in ports through which the wires are lead in from the terminal accommodating portions toward the wire accommodating portion, and at least either the lead-in ports on the terminal accommodating portion side or the lead-in ports on the wire accommodating portion side each include a protruding portion that protrudes in a direction away from the first elastic joining portion.

According to the above-described aspect, by including the protruding portion that protrudes in a direction away from the first elastic joining portion in at least either the lead-in ports on the terminal accommodating portion side and the lead-in ports on the wire accommodating portion side, the wire can be separated from the first elastic joining portion by the protruding portion when the wire is arranged in the lead-in port. Accordingly, since it is possible to suppress a case in which the wire is pinched at the first elastic joining portion, damage to the wire can be suppressed.

In the above-described battery wiring module, it is preferable that the protruding portions are provided in both the lead-in ports on the terminal accommodating portion side and the lead-in ports on the wire accommodating portion side.

According to the above-described aspect, due to the protruding portions being provided in both the lead-in ports on the terminal accommodating portion side and the lead-in ports on the wire accommodating portion side, it is possible to more reliably separate the wires from the first elastic joining portions using the protruding portions. Accordingly, since it is possible to suppress a case in which the wires are pinched at the first elastic joining portions, damage to the wires can be suppressed.

In the above-described battery wiring module, it is preferable that the protruding portions provided in the lead-in ports on the terminal accommodating portion side have a protrusion length with respect to the first elastic joining portions that is longer than a protrusion length with respect to the first elastic joining portions of the protruding portions provided in the lead-in ports on the wire accommodating portion side.

According to the above-described aspect, since the protruding portions provided in the lead-in ports on the terminal accommodating portion side have a protrusion length with respect to the first elastic joining portions that is longer than the protrusion length with respect to the first elastic joining portions of the protrusion portions provided in the lead-in ports on the wire accommodating portion side, it is possible to restrict movement of the wires in the terminal accommodating portions while increasing the degree of freedom of the wires in the wire accommodating portion.

In the above-described battery wiring module, it is preferable that the lead-in ports are open in a direction intersecting a lead-in direction of leading in from the terminal accommodating portions to the wire accommodating portion side, and have leading end sides in the opening direction that are wider than base end sides.

According to the above-described aspect, due to the leading end sides in the opening direction of the lead-in ports being wider than the base end sides, it is easy to introduce wires from the leading end sides in the opening direction of the lead-in ports.

In the above-described battery wiring module, it is preferable that the wire accommodating portion includes an extended wall portion that extends from an end portion in the direction in which the battery cells are aligned, and a plurality of the terminal accommodating portions are provided, and at least the terminal accommodating portion arranged opposing the extended wall portion in the direction in which the battery cells are aligned is joined on one side in the direction in which the battery cells are aligned by the first elastic joining portion, and is joined on another side in the direction in which battery cells are aligned by a third elastic joining portion that joins to the extended wall portion in an elastically-deformable manner.

According to the above-described aspect, since the terminal accommodating portion that is arranged opposing the extended wall portion provided on the end portion of the wire accommodating portion is joined by the first elastic joining portion and the third elastic joining portion, displacement that occurs when the battery cells expand and contract can be absorbed by the first elastic joining portion and the third elastic joining portion also in the terminal accommodating portion arranged opposing the extended wall portion. Here, in the battery wiring module, at the end portion in the direction in which the battery cells are aligned, for example, the wire accommodating portion cannot be arranged on both sides in the direction in which the battery cells are aligned in the terminal accommodating portion due to size restrictions and the like, and the wire accommodating portion can only be arranged on one side in some cases. For this reason, by providing the extended wall portion on the end portion in the direction in which the battery cells are aligned in the wire accommodating portion and elastically joining the extended wall portion and the terminal accommodating portion together using the third elastic joining portion as described above, it is possible to elastically join the terminal accommodating portion on both sides in the direction in which the battery cells are aligned.

In the above-described battery wiring module, it is preferable that the extended wall portion includes an opposing wall that opposes the terminal accommodating portion joined by the third elastic joining portion in the direction in which the battery cells are aligned, and the opposing wall includes a reinforcing rib.

According to the above-described aspect, due to the reinforcing rib being included on the opposing wall, it is possible to ensure the strength of the opposing wall, and it is possible to suppress a case in which the opposing wall deforms due to an external force.

Advantageous Effects of Invention

According to the battery wiring module of the present invention, the load that acts on the module-side terminals accompanying the expansion or contraction of the battery cells can be reduced.

DESCRIPTION OF EMBODIMENTS

Figure 1:
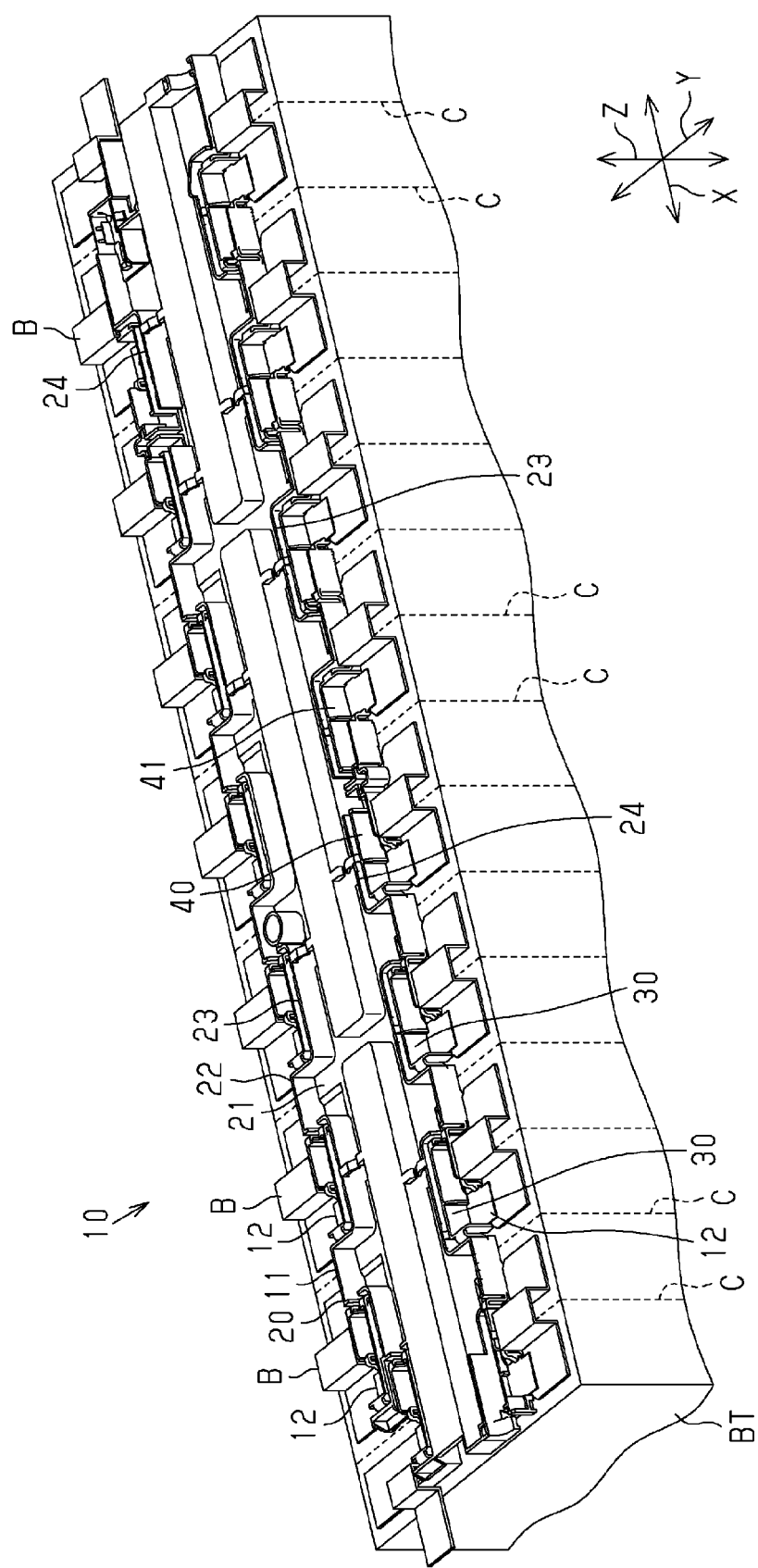
FIG. 1 is a perspective view of a battery wiring module according to a first embodiment.

Hereinafter, an embodiment of a battery wiring module will be described. Note that in the drawings, parts of configurations are shown exaggerated or simplified in some cases for convenience in the description. Dimensional proportions of the portions are also different from the actual dimensional proportions in some cases.

As shown in FIG. 1, the battery wiring module 10 is mounted on the upper surface of an approximately cuboid-shaped secondary battery BT. Note that the secondary battery BT is mounted in an electric automobile, a hybrid automobile, or the like, and supplies power to a travel motor of the vehicle. Also, the secondary battery BT receives a supply of power from the travel motor or the power generation motor according to the charge state or the driving state of the vehicle. Here, in the following description, among the three directions that are orthogonal to each other in FIG. 1, the X direction is the direction in which the battery cells are aligned, the Y direction is the width direction of the battery wiring module, and the Z direction is the up-down direction.

The secondary battery BT includes multiple battery cells C, and cathode terminals and anode terminals (not shown) of the battery cells C face the battery wiring module 10 (upward).

The multiple battery cells C are arranged aligned in the X direction. At this time, the battery cells C are aligned such that cathode terminals and anode terminals serving as battery terminals are alternatingly switched in the direction in which the battery cells C are aligned, that is, the X direction. The terminals are provided with bus bars B that connect the adjacent terminals, that is, the cathode terminals and the anode terminals. That is, the battery cells C are connected in series by the bus bars B. The bus bars B of the present example are connected through welding to the cathode terminals and the anode terminals of the battery cells C, for example.

Figure 3:
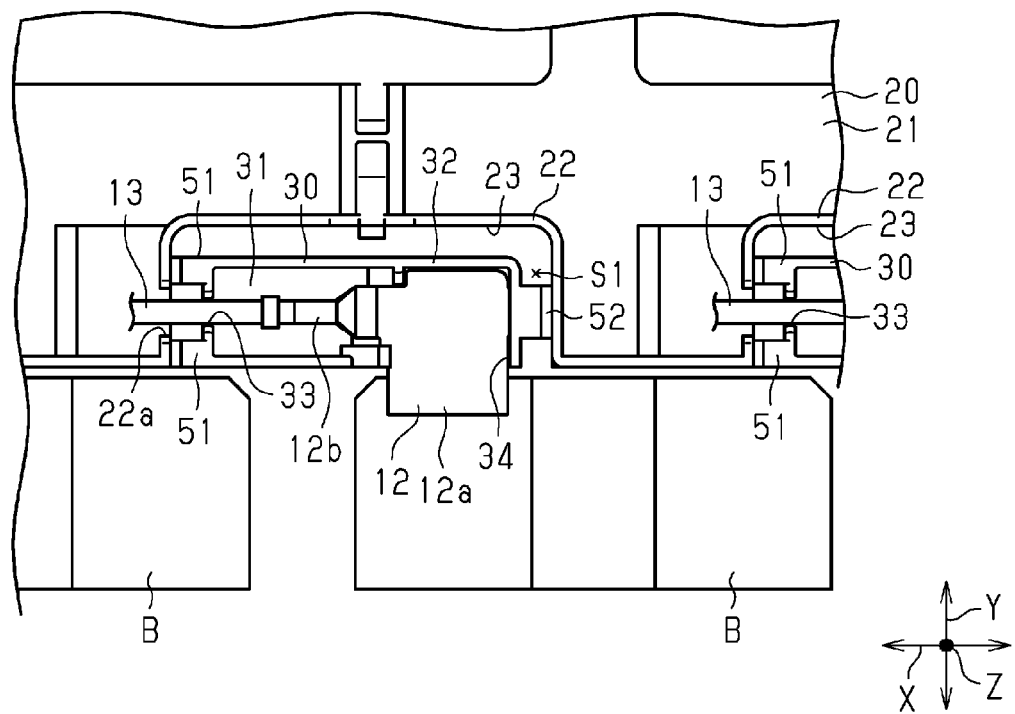
FIG. 3 is a top view showing a portion of the battery wiring module according to the first embodiment.

As shown in FIG. 1, the battery wiring module 10 includes: a housing 11; multiple module-side terminals 12; and multiple wires 13 (see FIG. 3).

The housing 11 has a shape whose dimension in the X direction, which is the direction in which the battery cells C are aligned, is longer than its dimension in the Y direction, which is the width direction, for example. The housing 11 has a shape with an opening formed on its upper side, and the opening is closed by a cover (not shown).

The housing 11 is constituted by a resin member, for example. The housing 11 includes: a wire accommodating portion 20 for accommodating wires; and terminal accommodating portions 30, 40, and 41 for accommodating the module-side terminals 12.

Figure 5:
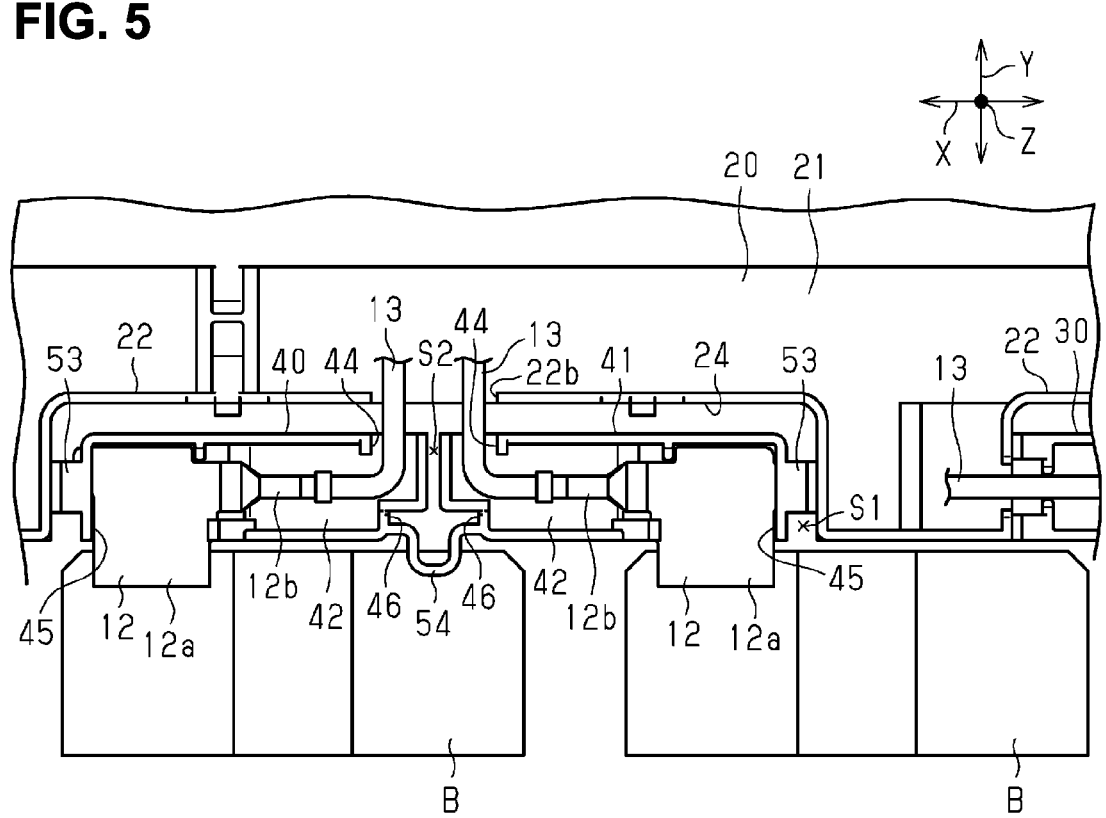
FIG. 5 is a top view showing a portion of the battery wiring module according to the first embodiment.

As shown in FIGS. 3 and 5, the module-side terminals 12 each include: a flat plate-shaped terminal main body 12a; and a barrel portion 12b that is continuous with the terminal main body 12a. The barrel portion 12b is electrically connected to a core wire of a wire 13.

As shown in FIGS. 1 to 5, the wire accommodating portion 20 of the housing 11 is demarcated in the housing 11 by a bottom portion 21 and side walls 22 that extend from the outer edge portions of the bottom portion 21. In the direction in which the multiple battery cells C are aligned, the wire accommodating portion 20 includes multiple recesses 23 and 24 that are recessed in a direction that is orthogonal to the direction in which the multiple battery cells C are aligned and that is orthogonal to the direction of stacking the housing 11 on the battery cells C, that is, the Y direction. One terminal accommodating portion 30 is provided in each recess 23. Two terminal accommodating portions 40 and 41 are provided in each recess 24.

Figure 2:
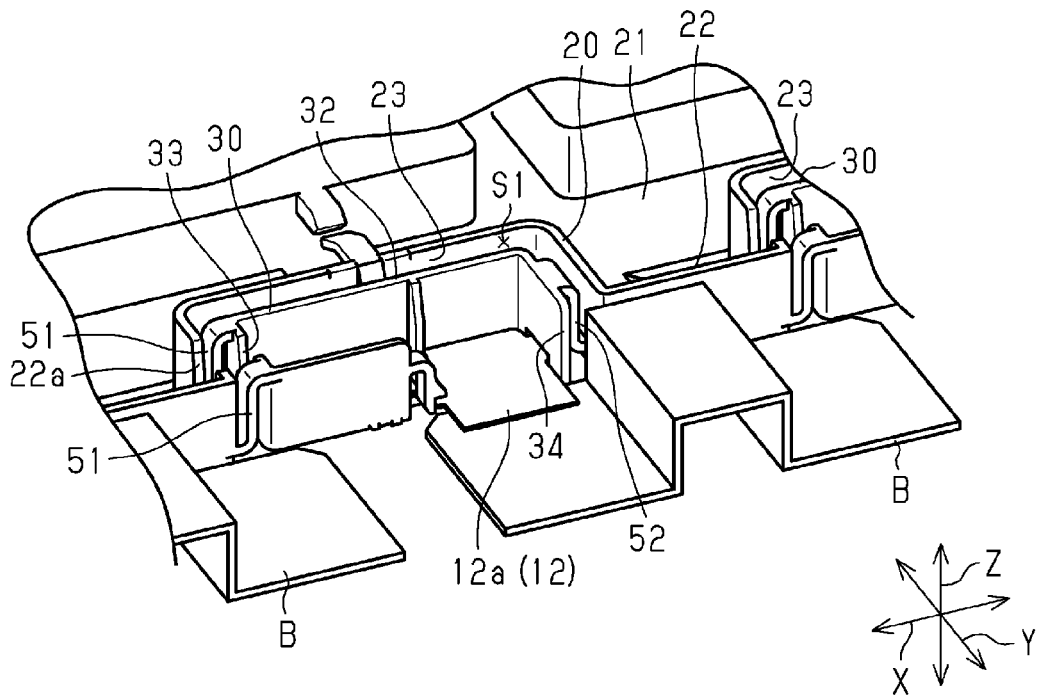
FIG. 2 is a perspective view of a portion of the battery wiring module according to the first embodiment.

As shown in FIGS. 2 and 3, the terminal accommodating portions 30 of the housing 11 are demarcated in the housing 11 by bottom portions 31 and side walls 32 that extend from the outer edge portions of the bottom portions 31. The terminal accommodating portions 30 are formed so as to have approximately cuboid shapes that are longer in the X direction. The recesses 23 of the terminal accommodating portions 30 and the wire accommodating portion 20 are provided with gaps S1 on both sides in the X direction and one side in the Y direction of the terminal accommodating portions 30. Also, the side walls 32 of the terminal accommodating portions 30 each include an opening portion 33 that is open in the X direction, and an opening portion 34 that is open in the Y direction orthogonal to the X direction.

As shown in FIGS. 2 and 3, in the X direction, the opening portion 33 that is open in the X direction of the terminal accommodating portion 30 opposes an opening portion 22a that is formed so as to be open on the side wall 22 of the wire accommodating portion 20. For this reason, the wire 13 connected to the module-side terminal 12 accommodated in the terminal accommodating portion 30 can be guided into the wire accommodating portion 20 using the opening portion 33 of the terminal accommodating portion 30 and the opening portion 22a of the wire accommodating portion 20. That is, the opening portion 33 of the terminal accommodating portion 30 and the opening portion 22a of the wire accommodating portion 20 function as openings for guiding (inserting) the wire 13.

As shown in FIGS. 2 and 3, the opening portion 34 is open to the outside (the side opposite to that of the wire accommodating portion 20) in the Y direction. The opening portion 34 can expose part of the terminal main body 12a of the module-side terminal 12 accommodated in the terminal accommodating portion 30 to the outside in the Y direction. The exposed portion of the terminal main body 12a that is partially exposed from the opening portion 34 is electrically connected to the bus bar B.

As shown in FIGS. 2 and 3, first elastic joining portions 51 and 52 are included between the wire accommodating portion 20 and the terminal accommodating portion 30. The first elastic joining portions 51 and 52 are provided on both sides in the X direction of the terminal accommodating portion 30, with the terminal accommodating portion 30 interposed therebetween. The two first elastic joining portions 51 are provided on both sides in the Y direction of the opening portion 33 on the opening portion 33 side, which is one side in the X direction of the terminal accommodating portion 30. One first elastic joining portion 52 is provided on the other side in the X direction of the terminal accommodating portion 30. The first elastic joining portions 51 and 52 are formed so as to have an approximate S shape in a view from the Y direction. Accordingly, the first elastic joining portions 51 and 52 more easily elastically deform in the X direction. In the present embodiment, the first elastic joining portions 51 connect the lower portions of the side walls 22 on both sides of the opening portion 22a of the wire accommodating portion 20 and the upper portions of the side walls 32 on both sides of the opening portion 33 of the terminal accommodating portion 30. Then, with the first elastic joining portions 51 and 52, if the terminal accommodating portion 30 moves in the Y direction relative to the wire accommodating portion 20, the first elastic joining portions 51 and 52 elastically deform.

Figure 4:
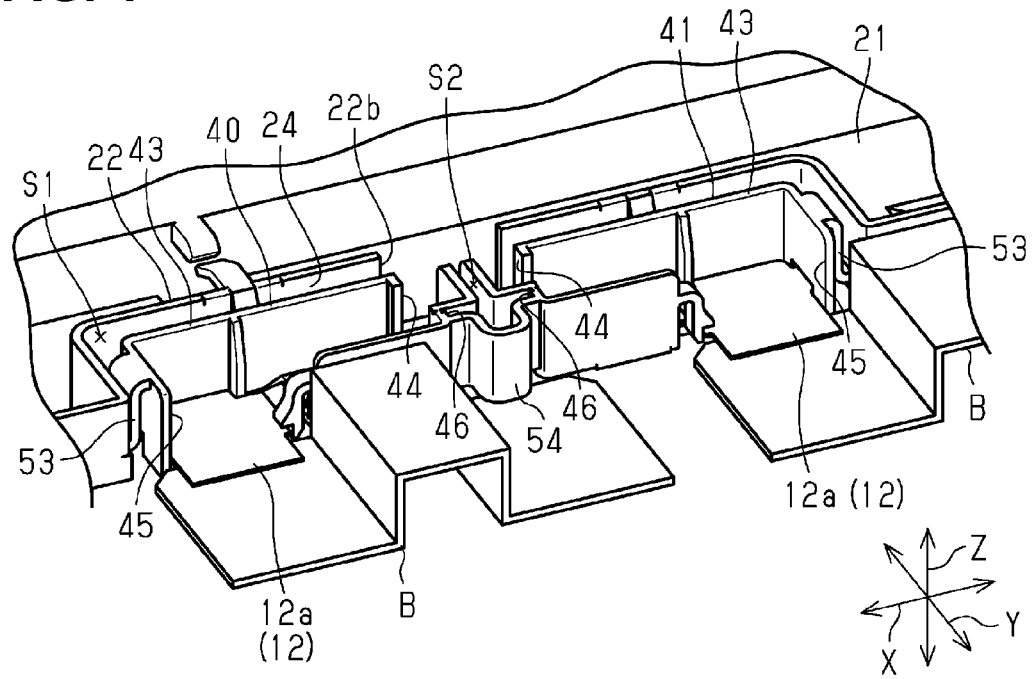
FIG. 4 is a perspective view of a portion of the battery wiring module according to the first embodiment.

As shown in FIGS. 4 and 5, the terminal accommodating portions 40 and 41 of the housing 11 are demarcated in the housing 11 by a bottom portion 42 and side walls 43 that extend from the outer edge portions of the bottom portion 42. The terminal accommodating portions 40 and 41 are formed so as to have approximate cuboid shapes that are longer in the X direction. The terminal accommodating portions 40 and 41 and the recess 24 of the wire accommodating portion 20 are provided with gaps S1 on one side in the X direction of the terminal accommodating portion 40, another side in the X direction of the terminal accommodating portion 41, and one side in the Y direction of the terminal accommodating portions 40 and 41. Also, the side walls 43 of the terminal accommodating portions 40 and 41 include opening portions 44 that are open to the wire accommodating portion 20 in the Y direction and opening portions 45 that are open to the side opposite to that of the wire accommodating portion 20 in the Y direction.

The opening portions 44 of the terminal accommodating portions 40 and 41 oppose, in the Y direction, the opening portion 22b that is formed so as to be open in the side wall 22 of the wire accommodating portion 20. The opening portion 22b is formed so as to open to the outside in the Y direction and is formed in the approximate center in the X direction of the recess 24. The wires 13 connected to the module-side terminals 12 accommodated in the terminal accommodating portions 40 and 41 can be guided into the wire accommodating portion 20 using the opening portion 44 of the terminal accommodating portions 40 and 41 and the opening portion 22b of the wire accommodating portion 20. That is, the opening portions 44 of the terminal accommodating portions 40 and 41 and the opening portion 22b of the wire accommodating portion 20 function as openings for guiding (inserting) the wires 13.

The opening portions 45 of the terminal accommodating portions 40 and 41 can expose portions of the terminal main bodies 12a of the module-side terminals 12 accommodated in the terminal accommodating portions 40 and 41 to the outside. The exposed portions of the terminal main bodies 12a that are partially exposed from the opening portions 45 are electrically connected to the bus bars B.

As shown in FIGS. 4 and 5, first elastic joining portions 53 are included between the wire accommodating portion 20 and the terminal accommodating portions 40 and 41. The first elastic joining portions 53 are provided at portions of the terminal accommodating portions 40 and 41 and the wire accommodating portion 20 that oppose each other the X direction. Here, the terminal accommodating portion 40 opposes the wire accommodating portion 20 on one side in the X direction, and the terminal accommodating portion 41 opposes the wire accommodating portion 20 on another side in the X direction.

A second elastic joining portion 54 is included between the terminal accommodating portion 40 and the terminal accommodating portion 41 that are adjacent in the X direction in the recess 24. The second elastic joining portion 54 protrudes from an opposing surface 46 in the X direction of the terminal accommodating portions 40 and 41, for example, and joins the terminal accommodating portions 40 and 41. The second elastic joining portion 54 is formed so as to have a cross section that is approximately U-shaped, and joins the terminal accommodating portions 40 and 41 in an elastically-deformable manner.

The second elastic joining portion 54 extends from the outer side in the direction inside of the opposing surface 46, and is formed curved so as to have a U shape on the outer side in the Y direction. That is, the second elastic joining portion 54 protrudes outward in the Y direction past the terminal accommodating portions 40 and 41. Also, the second elastic joining portion 54 is located above the bus bar B in the Z direction, which is the up-down direction, and can come into contact with the bus bar B in the Z direction. For this reason, the bus bar B is suppressed from moving upward.

Operations of the Present Embodiment Will be Described

The battery wiring module 10 of the present embodiment is arranged on the secondary battery BT, which has multiple battery cells C. The module-side terminals 12 of the battery wiring module 10 are connected to the bus bars B, which connect the cathode terminals and the anode terminals of the battery cells C that are aligned in the X direction. The ends on one side of the wires 13 are connected to the module-side terminals 12, and the ends on the other side of the wires 13 are connected to battery monitoring ECUs (not shown). The battery monitoring ECUs can monitor the voltages of the battery cells C.

Also, the first elastic joining portions 51, 52, and 53 are included between the wire accommodating portion 20 and the terminal accommodating portions 30 of the battery wiring module 10 and between the wire accommodating portion 20 and the terminal accommodating portions 40 and 41, and movement (displacement) accompanying the expansion and contraction operation of the battery cells C is allowed. Furthermore, the second elastic joining portions 54 are included between terminal accommodating portions 40 and 41 that are adjacent to each other in the direction in which the battery cells C are aligned, and movement (displacement) accompanying the expansion and contraction operation of the battery cells C is allowed.

Effects of the Present Embodiment Will be Described (1-1) The wire accommodating portion 20 and the terminal accommodating portions 30, 40, and 41 are joined by the first elastic joining portions 51, 52, and 53 in an elastically-deformable manner in the direction in which the battery cells C are aligned, and thus even if the battery cells C expand or contract, the displacement can be absorbed by the elastic deformation of the first elastic joining portions 51, 52, and 53. That is, the terminal accommodating portions 30, 40, and 41 can comply due to the elastic deformation of the first elastic joining portions 51, 52, and 53 when the module-side terminals 12 connected to the bus bars B comply with the expansion and contraction of the battery cells C. Accordingly, the load acting on the module-side terminals 12 can be suppressed.

(1-2) The terminal accommodating portions 40 and 41 that are adjacent in the direction in which the battery cells C are aligned are joined by the second elastic joining portion 54 in an elastically-deformable manner, and thus even if the battery cells C expand or contract, the displacement can be absorbed by the elastic deformation of the second elastic joining portion 54. That is, the module-side terminals 12 connected to the bus bars B can comply with the bus bars B to which they are connected, accompanying expansion or contraction of the battery cells C. At this time, the module-side terminals 12 move toward or away from each other in some cases, but the terminal accommodating portions 40 and 41 can comply due to the terminal accommodating portions 40 and 41 being joined in an elastically-deformable manner by the second elastic joining portion 54 as described above. Accordingly, the load acting on the module-side terminals 12 can be suppressed.

(1-3) The second elastic joining portions 54 constituting the blocking wall portions are included in the gaps S2 between the terminal accommodating portions 40 and 41 that are adjacent to each other in the direction in which the battery cells C are aligned, and thus spatter that occurs when performing connection of the module-side terminals 12 and the bus bars B and connection of the bus bars B and the battery terminals through welding is prevented from flying into the gaps S2. Accordingly, spatter is suppressed from flying to the wires 13, and damage to the wires 13 can be suppressed.

(1-4) By using a configuration in which the second elastic joining portions 54 also serve as blocking wall portions, the second elastic joining portions 54 and the blocking wall portions can be suppressed from being included separately.

(1-5) By including the terminal accommodating portions 30, 40, and 41 in the recesses 23 and 24, it is possible to suppress an increase in the size of the battery wiring module 10 caused by the terminal accommodating portions 30, 40, and 41.

(1-6) Since a configuration is used in which the elastic joining portions 51, 52, 53, and 54 are provided in only the terminal accommodating portions 30, 40, and 41, the rigidity of the wire accommodating portion 20 side can be ensured.

(1-7) The elastic joining portions 51, 52, 53, and 54 have a height (length) equal to that of the side walls 22, 32, and 43, which are adjacent in the Z direction, which is the up-down direction, and therefore it is possible to suppress an increase in size in the direction Z caused by the elastic joining portions 51, 52, 53, and 54.

Second Embodiment

Next, a second embodiment of the battery wiring module will be described with reference to FIGS. 6 and 7. Note that differences from the first embodiment will mainly be described in the present embodiment, and in some cases, configurations that are the same as those of the first embodiment will be denoted by the same reference numerals thereas, and some or all description thereof will be omitted.

Figure 6:
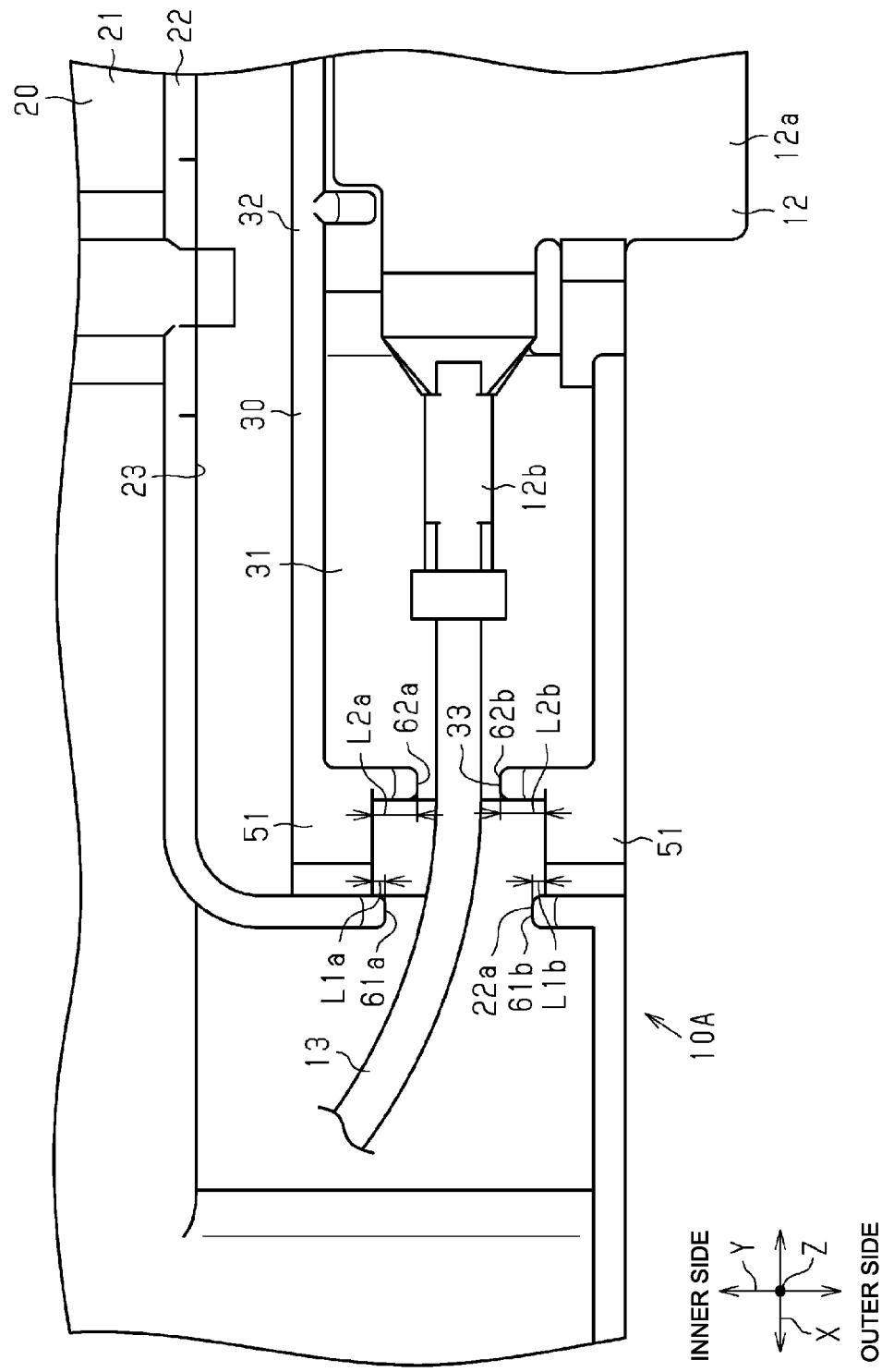
FIG. 6 is an enlarged top view of a portion of a battery wiring module according to a second embodiment.

As shown in FIG. 6, opening portions 22a and 33 of the battery wiring module 10A are located on both sides in the X direction of the first elastic joining portions 51, similarly to the first embodiment. The opening portions 22a and 33 include protruding portions 61a, 61b, 62a, and 62b that protrude in the Y direction, which is the direction away from the first elastic joining portion 51.

The protruding portions 61a and 61b are provided in the opening portion 22a of the wire accommodating portion 20. The protruding portion 61a is located on the inner side in the Y direction in the opening portion 22a and protrudes toward the outer side in the Y direction from the first elastic joining portion 51 located on the inner side in the Y direction out of the two first elastic joining portions 51. The protruding portion 61b is located on the outer side in the Y direction in the opening portion 22a, and protrudes toward the inner side in the Y direction from the first elastic joining portion 51 located on the outer side in the Y direction out of the two first elastic joining portions 51.

The protruding portions 62a and 62b are provided in the opening portion 33 of the terminal accommodating portion 30. The protruding portion 62a is located on the inner side in the Y direction in the opening portion 33, and protrudes toward the outer side in the Y direction from the first elastic joining portion 51 located on the inner side in the Y direction out of the two first elastic joining portions 51. The protruding portion 62b is located on the outer side in the Y direction in the opening portion 33, and protrudes toward the inner side in the Y direction from the first elastic joining portion 51 that is located on the outer side in the Y direction out of the two first elastic joining portions 51. A protrusion length L2a of the protruding portion 62a with respect to the first elastic joining portion 51 located on the inner side in the Y direction is greater than a protrusion length L1a of the protruding portion 61a with respect to the first elastic joining portion 51 located on the inner side in the Y direction. A protrusion length L2b of the protruding portion 62b with respect to the first elastic joining portion 51 located on the outer side in the Y direction is greater than a protrusion length L1b of the protruding portion 61b with respect to the first elastic joining portion 51 located on the outer side in the Y direction. In the present example, the protrusion length L1a of the protruding portion 61a and the protrusion length L1b of the protruding portion 61b are the same length. Similarly, the protrusion length L2a of the protruding portion 62a and the protrusion length L2b of the protruding portion 62b are the same length.

Figure 7:
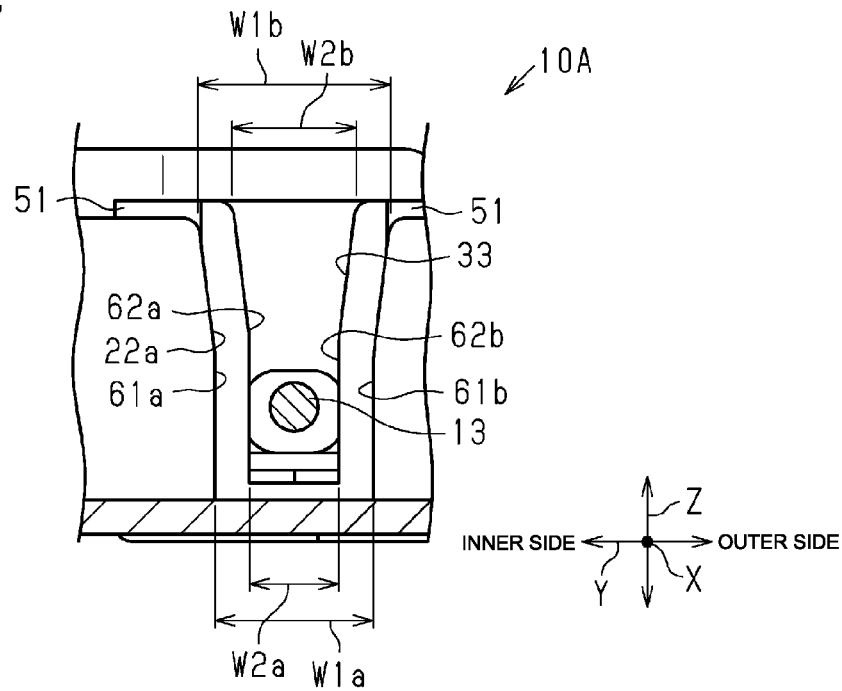
FIG. 7 is a cross-sectional view showing a portion of the battery wiring module according to the second embodiment.

As shown in FIG. 7, the opening portion 22a is open to the upper side in the Z direction, which intersects the X direction, which is a lead-in direction of leading the wire 13 in from the terminal accommodating portion 30 to the wire accommodating portion 20 side, and a width W1b on the leading end side in the opening direction is wider than a width W1a on the base end side. The opening portion 33 is open to the upper side in the Z direction, which intersects the X direction, which is the lead-in direction of leading the wire 13 in from the terminal accommodating portion 30 to the wire accommodating portion 20 side, and a width W2b on the leading end side in the opening direction is wider than a width W2a on the base end side.

According to the above-described embodiment, the following effects can be exhibited in addition to the effects of (1-1) to (1-7) of the first embodiment.

(2-1) The protruding portions 61a, 61b, 62a, and 62b that protrude in the direction away from the first elastic joining portions 51 are included in the opening portion 33 serving as the lead-in port on the terminal accommodating portion 30 side and the opening portion 22a serving as the lead-in port on the electrical accommodating portion 20 side. Accordingly, the wire 13 can be separated from the first elastic joining portions 51 by the protruding portions 61a, 61b, 62a, and 62b when the wire 13 is arranged in the opening portions 22a and 33. For this reason, since a case is suppressed in which the wire 13 is pinched at the first elastic joining portions 51, damage to the wire 13 can be suppressed. In particular, due to the protruding portions 61a, 61b, 62a, and 62b being provided on both of the opening portion 22a and the opening portion 33, the wire 13 can be more reliably separated from the first elastic joining portions 51 by the protruding portions 61a, 61b, 62a, and 62b. Accordingly, since a case is suppressed in which the wire 13 is pinched at the two first elastic joining portions 51, it is possible to suppress damage to the wire 13.

(2-2) The protrusion lengths L2a and L2b of the protruding portions 62a and 62b with respect to the first elastic joining portions 51 are longer than the protrusion lengths L1a and L1b of the protruding portions 61a and 61b with respect to the first elastic joining portions 51. For this reason, the opening portion 22a on the wire accommodating portion 20 side is relatively wider than the opening portion 33 on the terminal accommodating portion 30 side. For this reason, it is possible to restrict movement of the wire 13 in the opening portion 33 on the terminal accommodating portion 30 side while increasing the degree of freedom of the wire 13 in the opening portion 22a on the wire accommodating portion 20 side.

(2-3) Due to the widths W1b and W2b on the leading end side in the Z direction, which is the opening direction of the opening portions 22a and 33, being greater than the widths W1a and W2a on the base end side, it is easy to introduce the wire 13 from the open leading end sides of the opening portions 22a and 33.

Third Embodiment

Next, a second embodiment of the battery wiring module will be described with reference to FIGS. 8, 9, and 10. Note that differences from the first embodiment will mainly be described in the present embodiment, and in some cases, configurations that are the same as those of the first embodiment will be denoted by the same reference numerals thereas, and some or all description thereof will be omitted.

Figure 8:
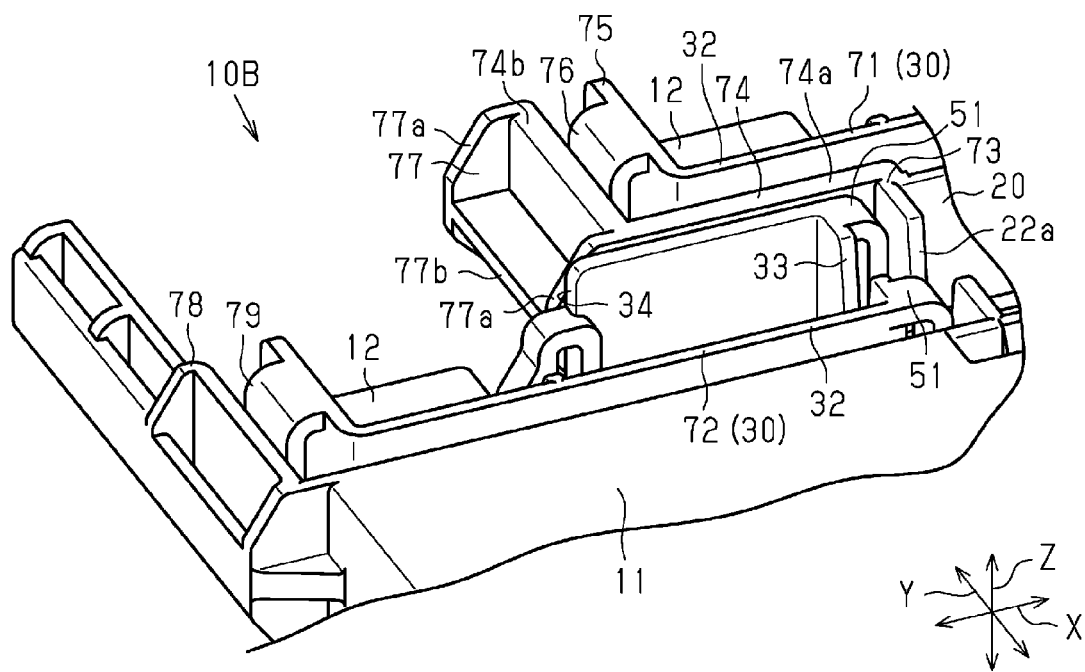
FIG. 8 is a perspective view showing a portion of a battery wiring module according to a third embodiment.
Figure 9:
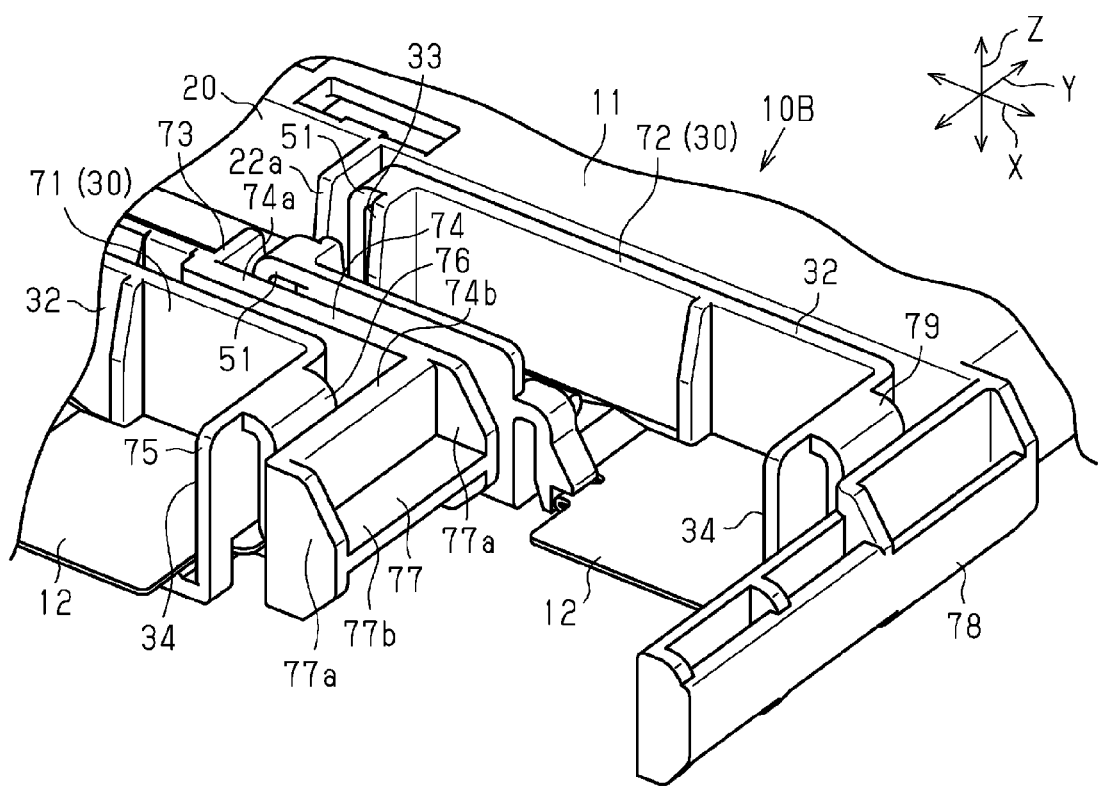
FIG. 9 is a perspective view of a portion of the battery wiring module according to the third embodiment.
Figure 10:
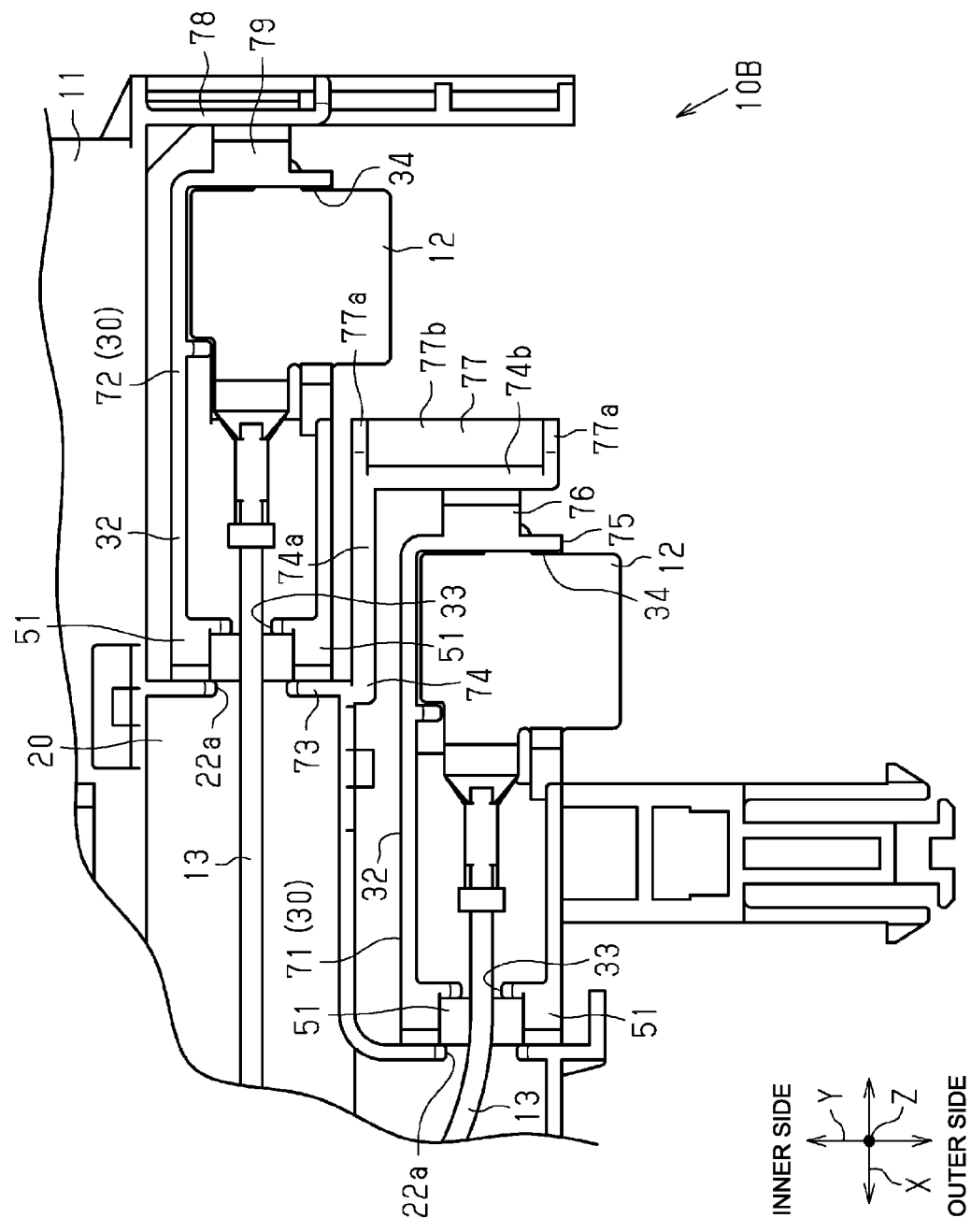
FIG. 10 is a top view showing a portion of the battery wiring module according to the third embodiment.

As shown in FIGS. 8, 9, and 10, a battery wiring module 10B includes a wire accommodating portion 20 and multiple terminal accommodating portions 30.

The terminal accommodating portions 30 shown in FIGS. 8, 9, and 10 are located on one end portion side in the X direction, which is the direction in which the battery cells C are aligned in the multiple terminal accommodating portions 30. The two terminal accommodating portions 30 that are located on one end portion in the X direction partially overlap in the Y direction, which is the width direction of the battery wiring module. In the following description, the terminal accommodating portions that partially overlap in the Y direction are terminal accommodating portions 71 and 72. The terminal accommodating portion 71 is located on the outer side in the Y direction with respect to the terminal accommodating portion 72. The terminal accommodating portion 72 is located relatively toward the end portion in the X direction with respect to the terminal accommodating portion 71.

The wire accommodating portion 20 includes an extended wall portion 74 that extends from the end portion 73 in the X direction, which is the direction in which the battery cells C are aligned. The extended wall portion 74 includes a first extended wall 74a that extends from the end portion 73 in the X direction and a second extended wall 74b that extends outward in the intersecting Y direction on the leading end side of the first extended wall 74a. The second extended wall 74b opposes the terminal accommodating portion 71 in the X direction. More specifically, the second extended wall 74b opposes, in the X direction, the wall portion 75 on the opposite side in the X direction from the wall portion at which the opening portion 33 is provided in the side wall 32 forming the terminal accommodating portion 71. Also, the terminal accommodating portion 71 is joined by the second extended wall 74b and a third elastic joining portion 76 of the extended wall portion 74. The third elastic joining portion 76 is formed so as to have an approximate S shape in a view from the Y direction, similarly to the first elastic joining portions 51 and 52. Accordingly, the third elastic joining portion 76 more easily elastically deforms in the X direction. That is, the terminal accommodating portion 71 arranged opposing the extended wall portion 74 in the X direction of the present example is joined on one side in the X direction by the first elastic joining portions 51, and is joined on another side in the X direction by the third elastic joining portion 76 that joins to the extended wall portion 74 in an elastically-deformable manner.

Also, the second extended wall 74b serving as the opposing wall of the extended wall portion 74 includes a reinforcing rib 77. The reinforcing rib 77 includes two first reinforcing walls 77a and one second reinforcing wall 77b. The two first reinforcing ribs 77a extend from a surface on a side opposite to the third elastic joining portion 76 of both side end portions in the Y direction of the second extended wall 74b. The second reinforcing wall 77b connects the two first reinforcing walls 77a and extends from a surface on a side opposite to the third elastic joining portion 76 on both side end portions in the Y direction of the second extended wall 74b. In this manner, a case in which the second extended wall 74b deforms due to an external force is suppressed by using a configuration in which the reinforcing rib 77 is included in the second extended wall 74b.

The terminal accommodating portion 72 includes an opening portion 33 that opens on one side in the X direction and an opening portion 34 that opens in the Y direction intersecting the X direction. The terminal accommodating portion 72 is joined to the end portion 73 of the wire accommodating portion 20 by the first elastic joining portions 51. The end portion of the terminal accommodating portion 72 on the side opposite to the first elastic joining portions 51 is joined by a fourth elastic joining portion 79 to an extended wall portion 78 provided on the end portion in the X direction of the housing 11. That is, the terminal accommodating portion 72 is joined on one side in the X direction by the first elastic joining portion 51, and is joined on the other side in the X direction by the fourth elastic joining portion 79 that joins to the extended wall portion 78 in an elastically-deformable manner. Note that the terminal accommodating portion 72 partially overlaps with the terminal accommodating portion 71 in the Y direction, which is the X-Y plane and the width direction of the battery wiring module. For this reason, an increase in the size in the X direction of the battery wiring module 10B due to the terminal accommodating portion 72 is suppressed.

According to the above-described embodiment, the following effects can be exhibited in addition to the effects of (1-1) to (1-7) of the first embodiment.

(3-1) Since the terminal accommodating portion 71 arranged opposing the extended wall portion 74 that is provided on the end portion 73 of the wire accommodating portion 20 is joined by the first elastic joining portions 51 and the third elastic joining portion 76, displacement that occurs when the battery cells C expand and contract can be absorbed by the first elastic joining portions 51 and the third elastic joining portion 76 also in the terminal accommodating portion 71 arranged opposing the extended wall portion 74. Here, in the battery wiring module 10B, at the end portion in the direction in which the battery cells C are aligned, for example, in some cases, the wire accommodating portion 20 cannot be arranged on both sides in the X direction of the terminal accommodating portion 71 due to size restrictions and the like, and the wire accommodating portion 20 can only be arranged on one side. For this reason, due to the extended wall portion 74 being provided on the end portion 73 in the X direction of the wire accommodating portion 20 and the extended wall portion 74 and the terminal accommodating portion 71 being elastically joined together by the third elastic joining portion 76 as described above, the terminal accommodating portion 71 can be elastically joined on both sides in the X direction.

(3-2) Due to the reinforcing rib 77 being included in the second extended wall 74b serving as the opposing wall, it is possible to ensure the strength of the second extended wall 74b, and it is possible to suppress a case in which the second extended wall 74b serving as the opposing wall deforms due to an external force.

Note that the above-described embodiments can be implemented with the following modifications. The above-described embodiments and the following modifications can be implemented in combination with each other as long as there are no technical discrepancies.

In the above-described second embodiment, the protruding portions 62a and 62b had a configuration in which the protrusion lengths L2a and L2b with respect to the first elastic joining portion 51 are longer than the protrusion lengths L1a and Lib with respect to the first elastic joining portion 51 of the protruding portions 61a and 61b, but there is no limitation to this. For example, the lengths of the protrusion lengths L1a, Lib, L2a, and L2b of the protruding portions 61a, 61b, 62a, and 62b with respect to the first elastic joining portions 51 may also be the same. The protrusion lengths L2a and L2b of the protruding portions 62a and 62b with respect to the first elastic joining portions 51 may also be made shorter than the protrusion lengths L1a and Lib of the protruding portions 61a and 61b with respect to the first elastic joining portions 51.

In the above-described second embodiment, a configuration was used in which the widths W1b and W2b on the leading end side in the Z direction, which is the opening direction of the opening portions 22a and 33, are wider than the widths W1a and W2a on the base end portion, but there is no limitation to this. The widths W1a, W1b, W2a, and W2b of the opening portions 22a and 33 may also be the same. It is also possible to use a configuration in which the widths W1b and W2b on the leading end side are narrower than the widths W1a and W2a on the base end side.

In the above-described second embodiment, the protruding portions 61a, 61b, 62a, and 62b were provided, but it is also possible to employ a configuration in which at least one of the protruding portions 61a, 61b, 62a, and 62b is provided. In this configuration as well, the wire 13 can be separated from the first elastic joining portions 51 by at least one of the protruding portions 61a, 61b, 62a, and 62b, and therefore a case in which the wire 13 is pinched at the first elastic joining portions 51 is suppressed, and it is possible to suppress damage to the wire 13.

In the above-described third embodiment, a configuration was used in which the reinforcing rib 77 is provided, but it is also possible to employ a configuration in which the reinforcing rib 77 is omitted. Also, the shape of the reinforcing rib 77 can be modified as appropriate.

In the above-described embodiments, a configuration was employed in which the second elastic joining portions 54 are included between the adjacent terminal accommodating portions 40 and 41, but a configuration may also be employed in which the second elastic joining portions 54 are omitted. In this case, for example, the terminal accommodating portions 40 and 41 that are adjacent to each other may be connected using a rigid body or the terminal accommodating portions 40 and 41 may have an integrated configuration.

In the above-described embodiments, a configuration was used in which the second elastic joining portions 54 are also used if the second elastic joining portions 54 are to block the gaps S2 between the terminal accommodating portions 40 and 41 that are adjacent to each other in the direction in which the battery cells C are aligned, but the blocking wall portions and the second elastic joining portions 54 may also be provided separately.

In the above-described embodiments, although not particularly mentioned, a configuration may also be employed in which the blocking wall portions are provided so as to block the portions of the gaps S1 between the terminal accommodating portions 30, 40, and 41 and the wire accommodating portion 20, the portions facing the bus bars B.

In the above-described embodiments, a configuration was used in which blocking wall portions are included by providing the second elastic joining portions 54, but it is also possible to employ a configuration in which the blocking wall portions are omitted.

In the above-described embodiments, a configuration was used in which the terminal accommodating portions 30, 40, and 41 are provided in the recesses 23 and 24, but there is no limitation thereto.

LIST OF REFERENCE NUMERALS 10, 10A, 10B: Battery wiring module
11: Housing
12: Module-side terminal
13: Wire
20: Wire accommodating portion
30, 40, 41: Terminal accommodating portion
51, 52, 53: First elastic joining portion
54: Second elastic joining portion forming a blocking wall portion
22a: Opening portion (lead-in port)
23, 24: Recess
33: Opening portion (lead-in port)
61a, 61b, 62a, 62b: Protruding portion
71, 72: Terminal accommodating portion
74: Extended wall portion
74b: Second extended wall (opposing wall)
76: Third elastic joining portion
77: Reinforcing rib
78: Extended wall portion
B: Bus bar
C: Battery cell
L1a, L1b, L2a, L2b: Protrusion length
S1, S2: Gap

The invention claimed is:

1. A battery wiring module comprising:
module-side terminals that are electrically connected to bus bars connecting battery terminals of a plurality of battery cells;
wires with ends on one side connected to the module-side terminals; and
a housing for accommodating the wires and the module-side terminals,
wherein the housing includes:
a wire accommodating portion for accommodating the wires;
a plurality of terminal accommodating portions for accommodating the module-side terminals; and
first elastic joining portions joining the wire accommodating portion and the terminal accommodating portions in a direction in which the battery cells are aligned, in an elastically-deformable manner,
wherein the terminal accommodating portions and the wire accommodating portion include lead-in ports through which the wires are lead in from the terminal accommodating portions toward the wire accommodating portion, and at least either the lead-in ports on a terminal accommodating portion side or the lead-in ports on a wire accommodating portion side each include a protruding portion that protrudes in a direction away from a corresponding one of the first elastic joining portions.

2. The battery wiring module according to claim 1, comprising a second elastic joining portion joining terminal accommodating portions that are adjacent to each other in the direction in which the battery cells are aligned, in an elastically-deformable manner.

3. The battery wiring module according to claim 2, wherein the housing includes blocking wall portions that each block at least one of a gap between the wire accommodating portion and at least one of the terminal accommodating portions and a gap between adjacent ones of the terminal accommodating portions that are adjacent to each other in the direction in which the battery cells are aligned.

4. The battery wiring module according to claim 3, wherein the second elastic joining portion also serves as the blocking wall portion for blocking the gap between the terminal accommodating portions that are adjacent to each other in the direction in which the battery cells are aligned.

5. The battery wiring module according to claim 1,
wherein the wire accommodating portion includes a plurality of recesses in the direction in which the plurality of battery cells are aligned, the plurality of recesses being recessed in a direction that is orthogonal to the direction in which the plurality of battery cells are aligned, and that is orthogonal to a direction of stacking the housing on the battery cells, and
the terminal accommodating portions are included in the recesses.

6. The battery wiring module according to claim 1, wherein the protruding portions are provided in both the lead-in ports on the terminal accommodating portion side and the lead-in ports on the wire accommodating portion side.

7. The battery wiring module according to claim 6, wherein the protruding portions provided in the lead-in ports on the terminal accommodating portion side have a protrusion length with respect to the first elastic joining portions that is longer than a protrusion length with respect to the first elastic joining portions of the protruding portions provided in the lead-in ports on the wire accommodating portion side.

8. The battery wiring module according to claim 1, wherein the lead-in ports are open in a direction intersecting a lead-in direction of leading in from the terminal accommodating portions to the wire accommodating portion side, and have leading end sides in the opening direction that are wider than base end sides.

9. A battery wiring module comprising:
module-side terminals that are electrically connected to bus bars connecting battery terminals of a plurality of battery cells;
wires with ends on one side connected to the module-side terminals; and
a housing for accommodating the wires and the module-side terminals,
wherein the housing includes:
a wire accommodating portion for accommodating the wires;
a plurality of terminal accommodating portions for accommodating the module-side terminals; and
first elastic joining portions joining the wire accommodating portion and the terminal accommodating portions in a direction in which the battery cells are aligned, in an elastically-deformable manner, wherein
the wire accommodating portion includes an extended wall portion that extends from an end portion in the direction in which the battery cells are aligned, wherein
at least one of the terminal accommodating portions arranged opposing the extended wall portion in the direction in which the battery cells are aligned is joined on one side in the direction in which the battery cells are aligned by a corresponding one of the first elastic joining portions, and is joined on another side in the direction in which battery cells are aligned by a third elastic joining portion that joins to the extended wall portion in an elastically-deformable manner.

10. The battery wiring module according to claim 9, wherein
the extended wall portion includes an opposing wall that opposes the at least one of the terminal accommodating portions joined by the third elastic joining portion in the direction in which the battery cells are aligned, and
the opposing wall includes a reinforcing rib.

\* \* \* \* \*